July 29, 1969  K. WINKLER ETAL  3,458,116

AERODYNAMIC PRESSURE WAVE MACHINE

Filed Feb. 28, 1968

INVENTORS
Kurt Winkler
Alfred Wunsch
BY
Pierce, Scheffler & Parker
Attorneys

United States Patent Office 3,458,116
Patented July 29, 1969

3,458,116
AERODYNAMIC PRESSURE WAVE MACHINE
Kurt Winkler, Baden, and Alfred Wunsch, Wettingen, Switzerland, assignors to Aktiengesellschaft Brown, Boveri & Cie., Baden, Switzerland, a joint-stock company
Filed Feb. 28, 1968, Ser. No. 708,884
Claims priority, application Switzerland, June 21, 1967, 8,832/67
Int. Cl. F04b 37/02; F04d 29/26
U.S. Cl. 230—69                                       3 Claims

ABSTRACT OF THE DISCLOSURE

An aerodynamic pressure wave machine comprises a rotor including a hub on a rotor shaft, a cylindrical cover strip surrounding the hub and cell walls located between and secured to the hub and cover strip. Each cell wall curves out in cross-section to both sides of a radial passing through at least one of its two fastening points to the hub and cover strip respectively in order to reduce the stresses caused by centrifugal force at the fastening point.

Figure 1:
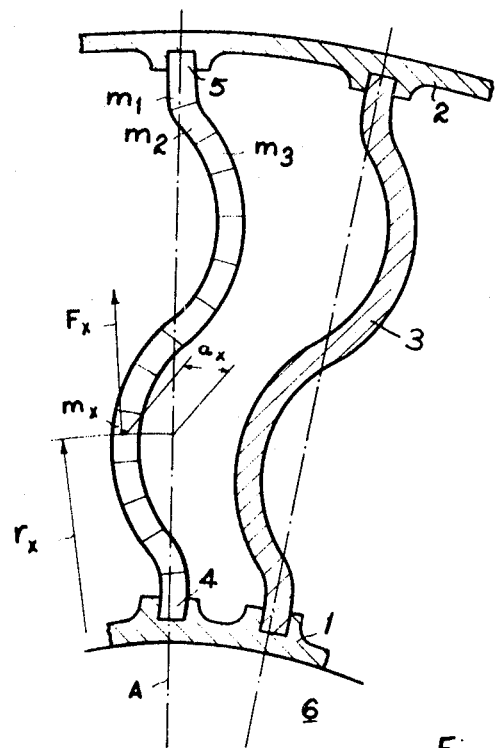

The present invention relates to an aerodynamic pressure wave machine whereof the rotor consists at least of a shaft, a hub, a cylindrical cover-strip and cell-walls having a double curvature in cross-section, which walls are fastened to the hub and to the cover-strip and extend in a substantially radial direction between them.

Aerodynamic pressure wave machines are cellular machines in which the pressure of a gaseous medium is increased by relaxation of another medium. The process of compression and expansion takes place under the action of compression and expansion waves in elongated cells open on the face, which cells are arranged on a rotor and move past the apertures of inlet and outlet ducts in the stator. The rotor normally consists of an inner cylinder and an outer cylinder hereinafter called the hub and cover-strip. They are linked to one another by walls which extend substantially radially, and which separate from one another the cells in which the pressure-exchange process takes place.

In one conventional form of embodiment, the rotor is supplied at one axial end with hot gas only, and at the other end with cold air only. Thus, in stationary operation the rotor is subjected to large differences in expansion and accordingly to thermal stresses. These are even heavier while all pressure wave machines are being started, since the individual parts of the rotor assume operating temperature with varying rapidity. It is therefore necessary when constructing rotors to take precautions so that stresses in the hub, cell-walls and cover-strip resulting from temperature-conditioned differences in expansion do not lead to fracture.

Several structural solutions are known for the purpose of eliminating this danger. One of them resides in subdividing the cover-strip into longitudinal segments when straight cell-walls are used, in order as a result to avoid any strain on the coverstrip with respect to the hub via the cell-walls. However, since the subdivision makes the cover-strip incapable of being self-supporting, the cell-walls must hold it and absorb all centrifugal forces, and must accordingly be made stronger. The points at which the cell-walls are fastened to the hub and to the cover-strip are also more heavily stressed. Furthermore, leakage-losses occur through the joints in the cover-strip.

There are also various known embodiments with a closed cover-strip wherein the cell-walls are straight in cross-section but inclined with respect to the radial (British patent specification 840,183), or unilaterally curved out and with a chord extending radially (British patent specification 866,935) or a chord inclined with respect to the radial (Swiss patent specification 270,114), or unilaterally curved out with radially disposed ends and a chord extending radially (U.S. patent specification 3,101,168). In these embodiments, the cell-walls serve as elastic members between the hub and the cover-strip, ensuring that there is compensation for expansion in the rotor. A disadvantage in this case is that the unilateral curvature and/or oblique attitude of the cell-walls causes centrifugal force to exert a moment on the points at which the cell-walls are fastened to the hub and to the cover-strip, which leads to relatively heavy stresses.

The problem of the invention is to avoid or at least to reduce the disadvantages described of the aerodynamic pressure wave machine. According to the invention, this problem is solved as a result of the fact each cell-wall curves or bends out in cross-section to both sides from a radial passing through at least one of its two fastening points. According to an advantageous embodiment of the invention, the outward bends or curves of the cell-wall to both sides of a radial are so mutually related, i.e. adapted to one another, that for the fastening point disposed in the radial, the resultant moment of centrifugal force of the cell-wall is at least substantially zero.

Figure 2:
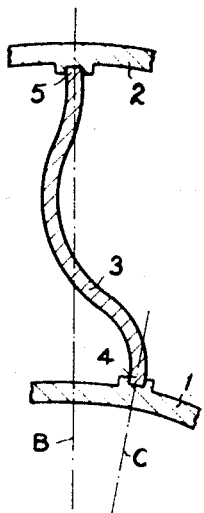
Figure 3:
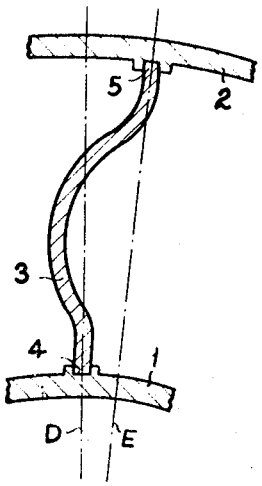

Several examples of embodiment of a cell-wall according to the invention are illustrated in cross-section in the drawing, wherein:

FIG. 1 shows cell-walls whereof both fastening points lie on a common radial;

FIGS. 2 and 3 each show a cell-wall whereof the two fastening points do not lie on a common radial.

According to FIGURE 1, each cell-wall 3 is attached to the hub 1 on shaft 6 at the fastening point 4 and to the cylindrical cover-strip 2 at the fastening point 5, which is generally done by soldering or welding. Both fastening points lie on the radial A from the shaft axis from which the doubly curved cell-wall bends out to both sides. If a thin element of cell-wall bounded by two cross-sections is imagined to be cut out, and is subdivided into the individual masses $m_1$, $m_2$, $m_3$ . . . . $m_i$, a centrifugal force F acts on each individual mass under the effect of the radial acceleration $r\omega^2$ when the rotor rotates. This results in an individual moment, referred to the radial A, which amounts, as may be easily understood, to $M_x = a_x F_x = a_x m_x r_x \omega^2$ for the individual mass $m_x$, if $r_x$ is the radius of the individual mass $m_x$, and $a_x$ its distance from the radial A in the peripheral direction. All the individual masses lying to the left of the radial produce a torque in the clockwise direction, and all the individual masses lying to the right of the radial produce a torque in the anti-clockwise direction. The two sums of the individual moments of all the individual masses lying to the right and left of the radial thus oppose one another, and accordingly partly cancel one another out. The remaining moment of centrifugal force must be taken up by corresponding reaction moments in the fastening points 4 and 5. These relationships and conditions are valid for each cell-wall element, and therefore also for the whole cell wall.

If the two outward bends or curves of the cell-wall to the right and left of the radial are of the same design as in FIGURE 1, the sum of the individual moments is nevertheless greater for the right-hand outward bend than for the left-hand outward bend, since the former is disposed further outwards radially, and therefore the radii belonging to the individual masses are greater, and also are the centrifugal forces and individual moments. Skilled mutual adaptation of the two outward bends, for example, shortening the chord-length for the right-hand outward bend or reducing the size of the outward bend, enables the sum of the individual moments for both outward bends to be made equal, so that the resultant moment of centrifugal force of the cell-wall becomes zero. Expressed mathematically and referred to FIGURE 1, this would be:

$$M_i = \Sigma a_i M_i r_i \omega^2 = 0$$

In this way it is possible completely to relieve the fastening points 4 and 5 of additional stresses.

The cell-walls illustrated in FIGURE 1 are of relatively complicated shape. Frictional losses on the walls and heat-exchange with the media flowing past will also be somewhat greater than in the case of straight or slightly curved cell-walls because of the larger surface-area. If reduction or elimination of the resultant moment of centrifugal force and thus also the necessary reaction moment is limited to one only of the two fastening points, simpler shapes may be chosen for the cell-walls, as depicted by way of example in FIGURES 2 and 3.

According to FIGURE 2, the cell-wall 3 bends out in cross-section to both sides of the radial B which passes through the point 5 of fastening to the cover-strip 2. The cell-wall is so designed that the resultant moment of centrifugal force becomes zero for the fastening point 5. On the contrary, the whole cell-wall diverges only to the left from the radial C which passes through the point 4 of fastening to the hub 1. This fastening point is acted on by the full sum of all the individual moments which must be taken up by it. For similar reasons, the point 4 of fastening to the hub 1 is moment-free for the cell-wall according to FIGURE 3, and the full sum of all the individual moments acts on the point 5 of fastening to the cover-strip 2.

The cell-walls illustrated in the drawing may naturally also be formed in mirror-image fashion, i.e. the cell-wall, proceeding outwards from the hub, bending out first to the right and then to the left in FIGURE 1. In FIGURES 2 and 3, the radial C would then lie to the left of the radial B, and the radial E to the left of the radial D.

Furthermore, the idea of the invention is not confined to the magnitudes of the outward bends in the cell-walls from a radial being constant along the axis of the rotor. The value $a_x$ in FIGURE 1 may, for example, be at its greatest at one end of the rotor, decrease continuously along the rotor, and reach a minimum at the other end thereof, where perhaps the temperature-conditioned differences in expansion amount only to a little. However, the value $a_x$ may also remain constant over part of the length of the rotor and decrease or increase continuously over the remaining part.

Shaping the cell-walls in the manner described makes it possible to reduce to zero the stresses caused by centrifugal forces on the points at which the cell-walls are fastened to the hub and to the cover-strip. The cell-walls are elastic in the radial direction, and are therefore capable of taking up differing expansion of the hub, the cover strip and the cell-walls themselves, but behave in a stiff fashion with respect to pressure-shocks in the working media and with respect to pressure-differences in neighboring cells.

We claim:

1. In an aerodynamic pressure wave machine comprising a rotor which includes at least a shaft, a hub on said shaft, a cylindrical cover strip surrounding said hub in radially spaced relation and a system of cell-walls having a double curvature in cross-section and extending between said hub and cover strip in a substantially radial direction and being fastened thereto, the improvement wherein each cell-wall curves out in cross-section to both sides from a radial passing through at least one of its two fastening points to said hub and cover strip, respectively.

2. An aerodynamic pressure wave machine as defined in claim 1 wherein said outward curves of the cell-wall have a mutual relation such that for said fastening points the resultant moment of centrifugal force of the cell-wall is at least substantially zero.

3. An aerodynamic pressure wave machine as defined in claim 1 wherein the amounts by which the cell-wall curves out from a radial differ along the axis of said rotor.

References Cited

UNITED STATES PATENTS 3,019,962   2/1962   Spalding.
3,101,168   8/1963   Berchtold.
3,291,380   12/1966   Brown et al.

FOREIGN PATENTS 383,594   11/1932   Great Britain.

HENRY F. RADUAZO, Primary Examiner

U.S. Cl. X.R.

60—39.45; 230—134